(12) United States Patent
Sidorin et al.

(10) Patent No.: US 7,332,044 B2
(45) Date of Patent: Feb. 19, 2008

(54) FABRICATION OF NARROW-BAND THIN-FILM OPTICAL FILTERS

(75) Inventors: Yakov Sidorin, Tucson, AZ (US); David L. Lunt, deceased, late of Tucson, AZ (US); by Geraldine Hogan, legal representative, Tucson, AZ (US)

(73) Assignee: Ieade Instruments Corp., Irvine, CA (US)

( * ) Notice: Subject to any disclaimer, the term of this patent is extended or adjusted under 35 U.S.C. 154(b) by 350 days.

(21) Appl. No.: 11/056,741

(22) Filed: Feb. 11, 2005

(65) Prior Publication Data

US 2005/0180015 A1 Aug. 18, 2005

Related U.S. Application Data

(60) Provisional application No. 60/544,447, filed on Feb. 13, 2004.

(51) Int. Cl.
*B32B 37/00* (2006.01)
*B32B 38/04* (2006.01)
*G02B 5/28* (2006.01)

(52) U.S. Cl. .................... 156/64; 156/152; 156/264; 156/306.3; 359/582

(58) Field of Classification Search ................ 156/182, 156/264, 306.3, 308.8
See application file for complete search history.

(56) References Cited

U.S. PATENT DOCUMENTS

| 6,112,005 A * | 8/2000 | Liu et al. ............... 385/130 |
| 6,334,924 B1 * | 1/2002 | Fukushima ............ 156/264 |
| 6,678,093 B1 * | 1/2004 | Scobey et al. ........... 359/578 |
| 2001/0030810 A1 * | 10/2001 | Gaebe ................... 359/584 |

* cited by examiner

*Primary Examiner*—Melvin Mayes
(74) *Attorney, Agent, or Firm*—Antonio R. Durando

(57) ABSTRACT

A multi-layer thin-film narrow-band filter is fabricated by a process wherein each half of a symmetric stack is deposited under exact conditions, either successively or contemporaneously. The two halves of the filter structure are then combined and bonded together using a wet bonding process that remains reversible for a period of time sufficient for testing the filter and, if necessary, for separating the two halves to regain access to the spacer layer. Accordingly, the spacer layer may be adjusted to shift the peak wavelength, if necessary, to the precise design specifications for a particular application. After correction, the components of the symmetric filter are bonded again using the same wet process.

16 Claims, 6 Drawing Sheets

US 7,332,044 B2

FABRICATION OF NARROW-BAND THIN-FILM OPTICAL FILTERS

RELATED APPLICATIONS

This application is based on and claims the priority of U.S. Provisional Application Ser. No. 60/544,447, filed Feb. 13, 2004.

BACKGROUND OF THE INVENTION

1. Field of the Invention

This invention relates to the general field of optical filters and, in particular, to the manufacture of multi-layered thin-film optical structures.

2. Description of the Prior Art

Optical filters are widely used as components of optical systems. In particular, they are employed in various spectroscopic and optical communication systems where information is transmitted within very narrow spectral bands. In order to retrieve the information contained in a particular band, the remaining spectral background (or spectral noise) has to be filtered out. This is achieved generally using optical filters that pass or reject (stop) the input light within a predetermined narrow-band spectral range.

A wide variety of optical filters is known in the art, the most fundamental one being a simple filter fabricated by depositing a thin-film stack of appropriately selected optical material on a suitable substrate. As commonly understood in the art, the terms "thin" and "optically thin" refer to an optical thickness less than or on the order of the wavelength of the light interest. For example, a third-of-a-micron thick layer of titania ($Ti_2O_5$) with a refractive index of about 2.1 in the visible portion of the spectrum is considered optically thin for visible light.

The spectral characteristics of multi-layer thin-film filters are determined by the combination of properties of the layered materials (such as refractive index, reflectance, transmittance, absorbance, density, and homogeneity) and their physical configuration (such thickness and the order of the layers in a stack). Narrow-band interference filters typically require symmetrical structures for proper spectral performance. That is, each layer in the structure has a corresponding layer symmetrically disposed within the multi-layer stack. Multiple such stacks may also be combined to form more complex filters.

Conventional techniques for fabricating thin-film optical filters include, for example, vacuum vapor deposition, deposition by electron-beam evaporation (EBE), techniques based on ion-assisted deposition (IAD), reactive ion plating, and ion-beam sputtering. All techniques utilize the same well-established manufacturing sequence. As illustrated in the multi-layer structure 10 of FIG. 1, a thin-film stack 12, sometime consisting of hundreds of layers, is deposited on a substrate 14 made of suitable optical material. The deposition is carried out in a vacuum chamber under well defined and controlled fabrication conditions and in a strict sequential order designed to produce specific filter characteristic, starting with the first layer 1 and sequentially building the stack up to the last layer n.

As is well understood in the art, narrow-band multi-layer filters include a symmetrical structure wherein a spacer layer separates two mirror-image multi-layered components. Thus, as illustrated in its simplest form in FIG. 2, the stack 12 includes a spacer layer 16 that is also formed during the sequential deposition process. All other layers are deposited such that each layer in the bottom half-stack 18 has a corresponding layer symmetrically deposited in the top half-stack 20. That is, layer 1 is intended to be exactly the same as layer n, layer 2 the same as layer n−1, and so on. A second optical substrate 22 may be also deposited or laminated on top of the multi-layer stack 12 to protect and increase the rigidity of the filter.

The sequential layer deposition of optical material is characterized by an inherent worsening of the material micro-structure in the layers (surface roughness, density, and presence of columnar structure within the volume) as the deposition progresses. This progressive deterioration is due in part to the material and the surface quality of the substrate 14 and in part to the conditions of deposition. It is known that deposition of thin films with very smooth surfaces requires that an extremely smooth and polished substrate be used (with a residual root-mean-square roughness of a few Angstrom, at least less than a nanometer and preferably about 1 Å for ceramics and metals). However, even under such ideal conditions, the residual structural defects and microscopic non-uniformities of each underlying layer propagate through the thickness of each newly deposited layer and grow more pronounced in the upper layers of the stack. This shortcoming is an especially critical problem in the fabrication of narrow-band interference filters because it materially affects the structural symmetry of the filter (even though macroscopic symmetry may be present). Since light scattering due to structural non-uniformities inevitably leads to broadening of the filter's band, in practice this shortcoming has prevented the reliable fabrication of extremely narrow-band filters (i.e., filters with bandwidths on the order of a few Angstrom or less), especially notch filters.

As a result of such structural deficiencies, the layers of each pair of such symmetrically disposed layers in the stack 12 are not structurally identical. Therefore, they do not perform optically in the same way under equal ambient conditions, which worsens the performance of the filter as a whole by broadening its bandwidth and shifting the peak wavelength of the band. This effect is further worsened by the fact that corresponding layers in the stack, because of their microscopic differences, also tend to react differently to ambient stresses, such as temperature and humidity changes after the stack is removed from the fabrication chamber.

Still another problem lies in the fact that, once a conventional filter has been fabricated, it is practically impossible to correct its spectral performance (such as its precise peak wavelength) by accessing and modifying the inner spacer layer 16 of the filter. This deficiency is very important, especially for very narrow-band etalon-type thin-film filters where the cavity provided by the spacer layer 16 determines the specific spectral characteristics of the filter. An error in the thickness of the spacer layer leads to a spectral shift of the peak wavelength of the interference filter. Therefore, the filter cannot be used for the intended purpose and is practically wasted.

These process drawbacks of the prior-art are unavoidable and contribute to the current very high cost of manufacture of narrow-band multi-layer thin-film filters. Therefore, there remains a need for a manufacturing approach that overcomes the problems and limitations described above.

SUMMARY OF THE INVENTION

This invention provides a new approach to the manufacture of multi-layer thin-film filters which allows the fabrication of filters with significantly reduced spectral bandwidth and permits post-fabrication tuning, if necessary, to the exact spectral-position specification of the filter's band.

The invention is based on the exploitation of two distinct ideas in the process of multi-layer filter manufacture.

According to one aspect of the invention, the fabrication sequence is carried out in a way that reduces the number of thin-film layers that are grown consecutively on top of one another in a filter stack. This approach reduces significantly the degree of structural non-uniformities propagated within the layers of the stack during the film deposition process and maximizes the structural symmetry of the filter. This is achieved by employing the process in which each half of the symmetric stack is deposited under exact conditions, either successively or contemporaneously.

The two halves of the filter structure are then combined and bonded together at the interface between the thin films constituting the top layers of the two halves, typically corresponding to a spacer layer in the symmetrical structure, to produce the complete symmetric stack of the filter. According to another aspect of the invention, this step is carried out using a wet bonding process that has been found to produce an interface of optical quality as good as found at the interface between deposited films. Moreover, the bonding process remains reversible for a period of time sufficient for testing the filter and, if necessary, for separating the two halves to regain access to the spacer layer. Accordingly, the spacer layer may be adjusted to shift the peak wavelength of the filter's band as needed to meet the design specifications for a particular application. After such correction, the components of the symmetric filter are bonded again using the same wet process.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The heart of the invention lies in the idea of substituting the conventional sequence of fabrication of symmetric thin-film filters (which always progresses sequentially by depositing each layer on top of the previous one, starting with the first layer in the stack and ending with its last layer) with a process wherein only each half of the symmetric stack is deposited sequentially. The two half stacks are then combined to produce the symmetric full-stack structure of the filter.

Narrow-band filters fabricated with this two-step approach produce significant advantages over analogous filters manufactured by conventional methods. First, they exhibit a substantially narrower width in the stop (or pass) band of interest, which is critically important in many applications. Second, the filter can be adjusted after fabrication to correct the exact spectral position of the filter's stop (or pass) band, if necessary, which is not possible with conventional filters.

According to one aspect of the invention, an advantage is achieved by fabricating each matching half-stack of the symmetric filter stack under conditions that produce substantially the same surface imperfections in each pair of corresponding layers in the two half-stacks, rather than depositing the entire stack in a single setting during which the surface imperfections of each underlying layer vary progressively as a result of propagation and produce different physical characteristics in corresponding layers of the two half-stacks. This approach enables the fabrication of multi-layer filter stacks with maximum structural symmetry. Therefore, the functional equivalence of the layers is optimized, producing a narrower spectral band than otherwise achievable by multi-layer deposition, as described in greater detail below.

According to another aspect of the invention, the two equal half-stacks so produced are combined to form the symmetrical structure of the filter using a wet bonding process which remains reversible for a period of time sufficient to test the characteristics of the filter. Therefore, if the desired specifications are not met, the filter can be taken apart to adjust the thickness of the spacer layer as needed for a particular application. Those skilled in the art will recognize that both advantages are exceptionally important in the construction of interference filters, especially in the case of extremely narrow-band interference filters (with bands on the order of several Angstrom or less) that comprise hundreds of layers.

Figure 1:
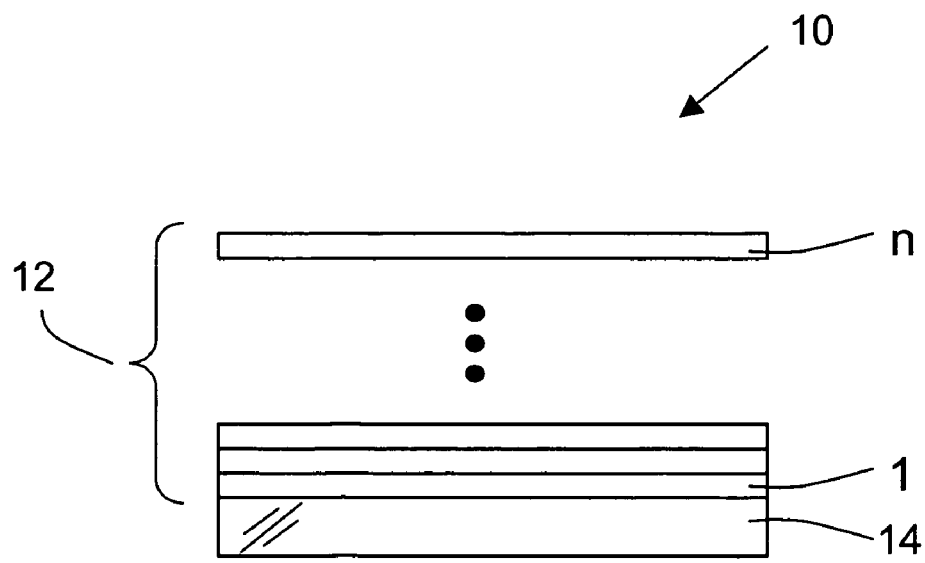
FIG. 1 illustrates schematically the order of fabrication and the structure of a conventional multi-layer thin-film filter.
Figure 2:
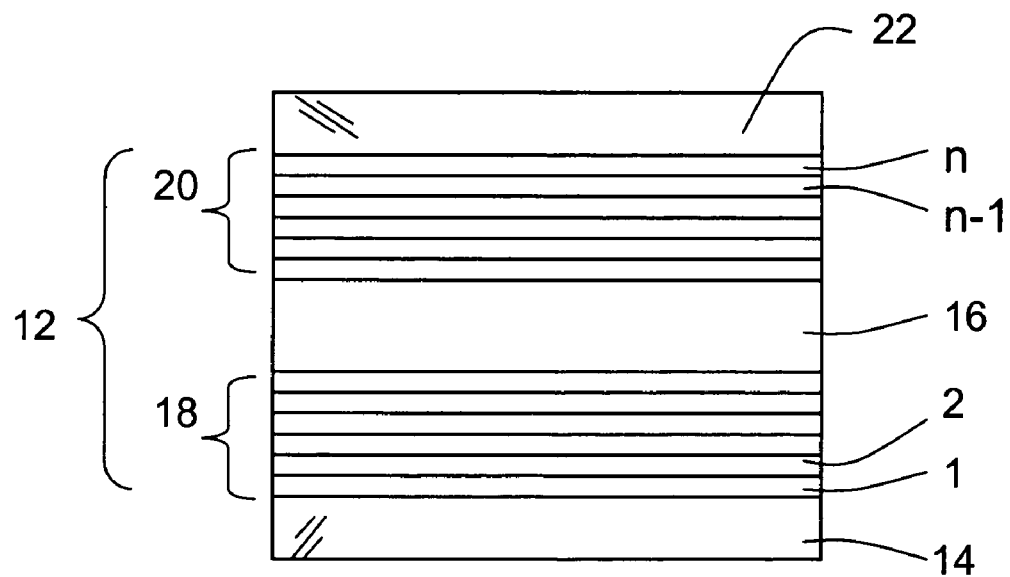
FIG. 2 illustrates schematically the structure of a conventional symmetric thin-film including a spacer layer sandwiched between two substantially equal multi-layer stacks in mirror-image disposition.
Figure 3:
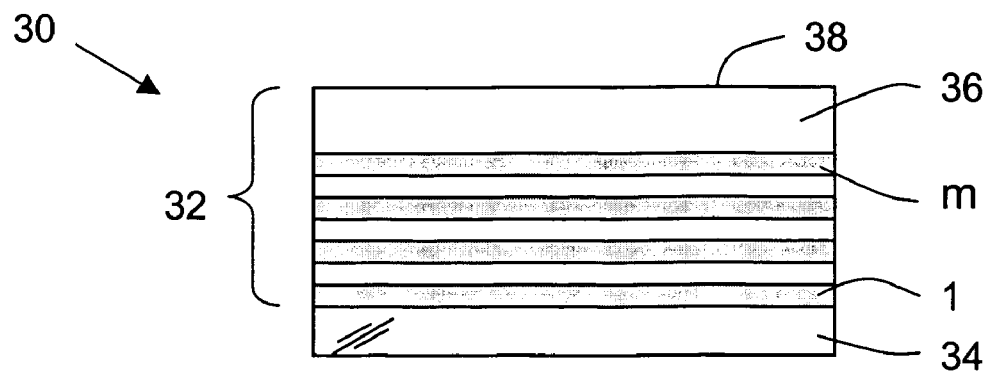
FIG. 3 is a schematic representation of a multi-layer thin-film half-stack, including half of the spacer layer, deposited according to the present invention as a step of the fabrication of a narrow-band thin-film filter.
Figure 4:
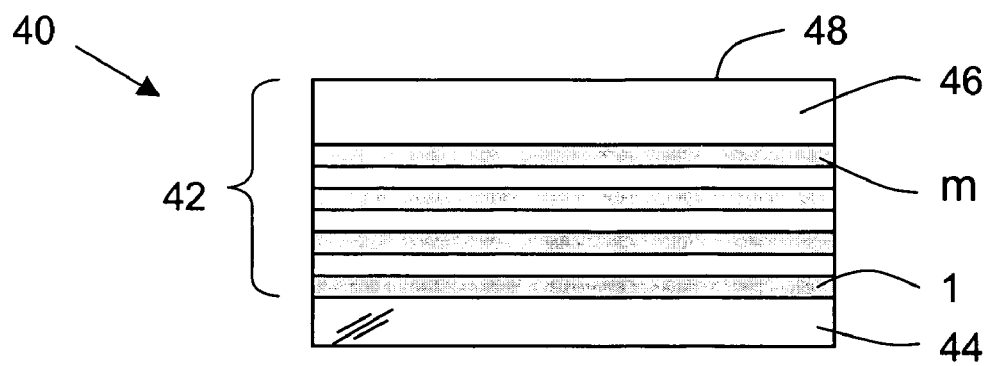
FIG. 4 is a schematic representation of an exact replica of the multi-layer thin-film half-stack, including the other half of the space payer, deposited according to the present invention as another step in the fabrication of a narrow-band thin-film filter.
Figure 5:
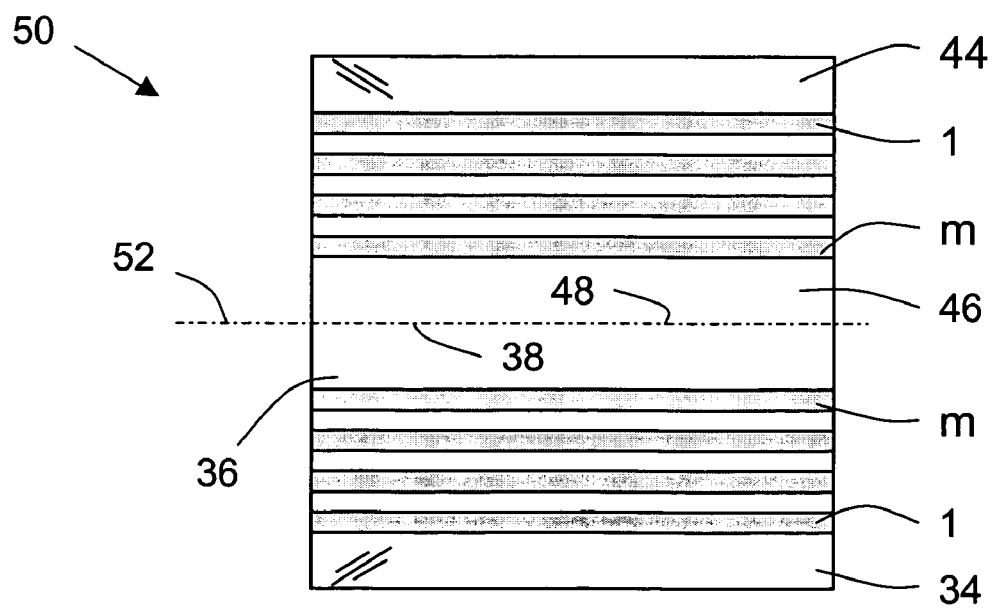
FIG. 5 is a schematic representation of the thin-film filter produced by wet bonding of the half-stacks of FIGS. 3 and 4.

Referring to the figures, wherein like parts are designated throughout with like numerals and symbols, FIGS. 3-5 illustrate schematically the structural components of thin-film stacks obtained at various stages of fabrication according to the method of the invention. FIGS. 3 and 4 show two matching elements 30 and 40 fabricated in a first stage, either simultaneously or sequentially, under identical manufacturing conditions (that is, using the same sequence of materials and the same deposition conditions and parameters). Using conventional methods of deposition, each of the multi-layer thin-film half-stacks 32,42 of the matching elements 30,40 is deposited on respective substrates 34,44, which may or may not be the same. Each substrate is preferably polished to high quality so that the residual root-mean-square (rms) roughness of their surfaces does not exceed a few Angstrom (in any case less than one nanometer and, in the case of metals and ceramics, preferably about 1 Å). This requirement of substrate preparation is discussed in further detail below. The deposition of the half-stacks 32,42 may be followed, if desired, by the conventional deposition of respective spacer layers 36,46 on top of the last layers m and m of each half-stack (note that both stacks necessarily have the same number of filter layers, m).

As a result of the same deposition process used for each matching element 30 and 40, two matching multi-layer structures are formed with terminating upper surfaces 38,48. Because the half-stacks 32,42 are deposited over respective substrates in conventional sequential fashion under the same deposition conditions (starting with the lowest layer 1 and ending with the highest layer m), their structural equivalence (measured by microscopic isotropy, columnar structure, porosity, and density of the layered materials) is maximized. Therefore, their optical performance under equal ambient conditions is also matched, as required for high-performance narrow-band filters. To further maximize the structural similarity and functional equivalence of the matching elements 30,40, both elements are preferably fabricated contemporaneously in the same processing cycle.

In a second stage of manufacture, a filter 50 (shown in FIG. 5) is obtained according to the invention by assembling the two matching elements 30 and 40 of FIGS. 3 and 4. The two terminating surfaces 38,48 are brought into optical contact along a bonding plane 52, thereby ensuring that the two half-stacks 32,42 produce a symmetric structure. This assembly step is preferably carried out utilizing the well known process of wet optical bonding, during which the terminating surfaces 38,48 are simply wetted and brought into optical contact. This bonding process produces an interface at the plane 52 of optical quality at least as good as is obtained between the film layers deposited during fabrication.

Over a period of several hours, a strong molecular bond is formed between the two surfaces 38 and 48. Such short-range "contact" surface forces consist of intermolecular forces between the molecules in the two interacting materials and the molecules of the wetting fluid medium. Contributors to these surface forces are electrostatic interactions between charged groups on the surfaces, ions and dipoles in the wetting fluid, van der Waals forces due to polarizability of molecules and materials, Born repulsion between molecules, and other effects. These forces bring the terminating surfaces 38,48 closer together with the passage of time and the strength of the bond along the bonding plane 52 grows as well with time and with the gradual evaporation of the molecular layer of wetting fluid placed between the surfaces.

Since surface forces act at very small distances (typically several Angstroms), the surfaces 38,48 must be extremely smooth for a well defined contact area to exist. This is provided by an appropriate initial polishing of the substrates 34,44. If these substrates are polished to a residual rms roughness on the order of Angstroms (as smooth as possible, depending on the material, but always less than one nanometer), the residual roughness does not increase substantially as a result of propagation as additional layers are deposited during manufacture of the multi-layer half-stacks 32,42. Thus, the resulting terminating surfaces 38,48 are extremely smooth, also on the order of a few Angstrom rms roughness, as required for a high-quality optical bond.

As a result of the two processing stages described above, an optimally symmetric multi-layer filter structure is always obtained. The maximum micro-structural departure from ideal (that is, non-isotropic, non-amorphous, and porous layered materials) of a filter 50 fabricated according to the invention is significantly smaller than that of conventional filters and, most importantly, it is optimally symmetric. In fact, to the extent that structural deviations from ideal in any single layer (which are inherent to the process of thin-film growth) are amplified as the number of layers in the stack increases, they are reproduced substantially equally in each half-stack of the filter. Therefore, filter performance is not materially affected and the structural superiority of the filter of the invention produces substantially narrower spectral bands than analogous conventional filter with the same number of layers, which is the single most important advantage provided by the invention.

Figure 6:
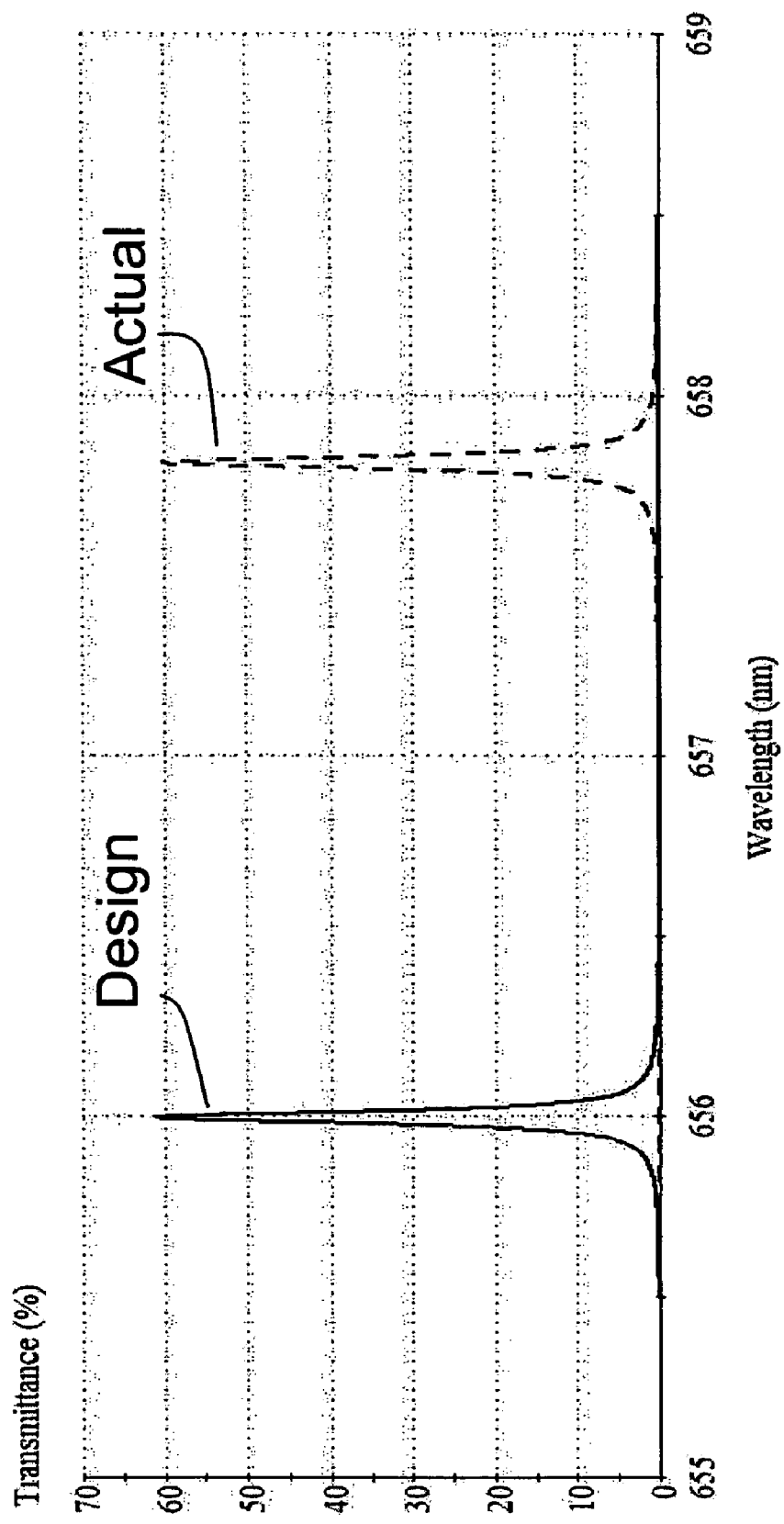
FIG. 6 illustrates the shift in the vicinity of the design peak wavelength in the transmission spectrum of a flawed filter and the post-fabrication correction produced by the present invention.

Another important aspect of the invention lies in the opportunity it affords to correct manufacturing errors. The need for correction of spectral positioning of the filter band may be ascertained routinely by appropriate optical testing conducted during the period of optical bonding. For example, assume that a single-cavity filter having the structure of the filter 50 of FIG. 5 is designed to operate at 656.0 nm using the design specification $(HL)^7H\ 32L\ H(LH)^7$, with titania ($TiO_2$) and silica ($SiO_2$) materials on silica substrates. As those skilled in the art will readily recognize, the notation used in the formula above indicates the type, number and sequence of the layers deposited to form the thin-film stack of the filter. H indicates a quarter-wave layer of high refractive-index material ($TiO_2$); L indicates a quarter-wave layer of low refractive-index material ($SiO_2$); and the coefficient and exponents indicate repetitions of the relevant layers. Assume that a slightly thicker spacer layer is produced corresponding to the specification $(HL)^7H\ 32.1L\ H(LH)^7$, thereby shifting the peak of the filter band with respect to the design peak wavelength by about 18 Angstrom, as by the peaks labeled Design and Actual in FIG. 6. Such a shift would be unacceptably high for any application that utilizes very narrow single-emission lines of the spectrum (such as in solar astronomy and telecommunication, for example), rendering a conventionally fabricated filter unusable and wasted.

A filter fabricated using the method of the invention, however, can be disassembled along the bonding plane 52 for a period of several hours after fabrication simply by soaking the filter in the wetting liquid used to bond the terminal surfaces 38,48 of the half-stacks manufactured as separate components of the filter. Once disassembled, either one of the spacer layers 36,46 can be modified by appropriate additional deposition of spacer material in the amount necessary to compensate the unwanted spectral shift by accessing the next spectral order of the filter. After that correction, the step of optical bonding is repeated. This flexibility of the process of the invention significantly reduces the cost of fabrication of complex ultra-narrow-band filters and represents another significant advance in the art.

Figure 7:
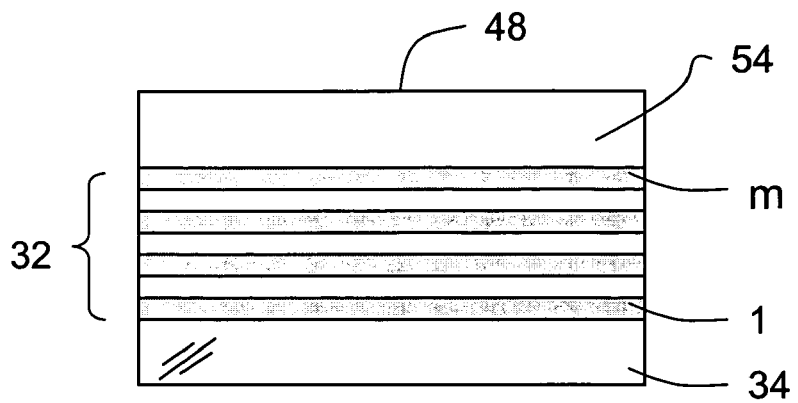
FIG. 7 illustrates schematically another multi-layer thin-film half-stack, including the entire spacer layer, of a narrow-band filter fabricated according to the invention.
Figure 8:
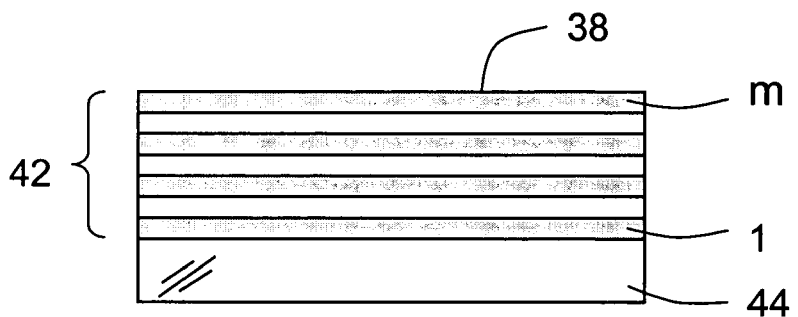
FIG. 8 is the same half-stack of FIG. 7, but without any spacer material, deposited according to the invention.
Figure 9:
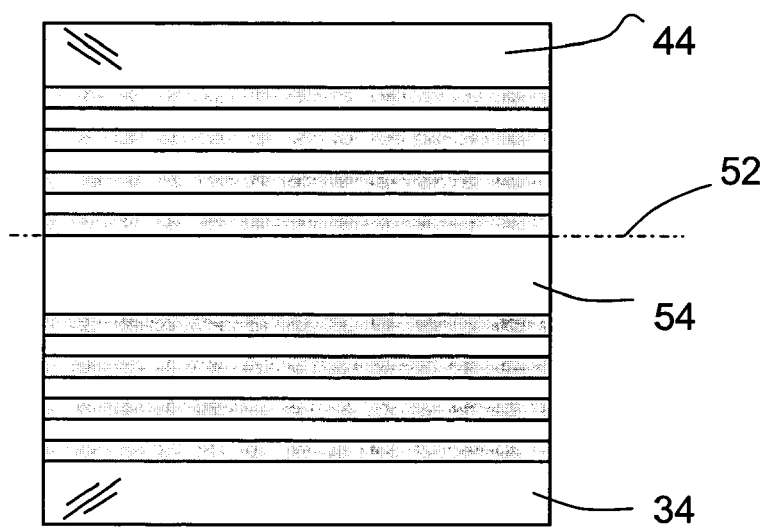
FIG. 9 is the narrow-band filter resulting by the combination of the half-stacks of FIGS. 7 and 8.

As illustrated above, the invention provides a simple and precise method of controlling the spectral properties of thin-film filters, especially ultra-narrow-band interference filters, and it may be implemented easily and at a low cost in any optical device using conventional components and known deposition processes. As would be clear to one skilled in the art, appropriate changes can be made with similar results. For instance, the substrate layers 34,44 of the two matching elements 30,40 may be the same or different, as best suited to a particular application. The two half-stacks 32,42 may be deposited at the same time or at different times under the same operating conditions. Similarly, the deposition of the spacer layer made up by the two layers 36,46 of FIGS. 3 and 4 can be apportioned in any arbitrary way within the scope of the invention. For example, the deposition could be carried out on a single half-stack, as illustrated in FIGS. 7-9, or distributed in any other way between the two half-stacks, so long as the aggregate thickness of the spacer layers amounts to the required value. Similarly, the spacer layer 54 may be deposited during fabrication of the two half-stacks 32,42 or added as a separate component optically bonded to the half-stacks using the same wet bonding process.

Figure 10:
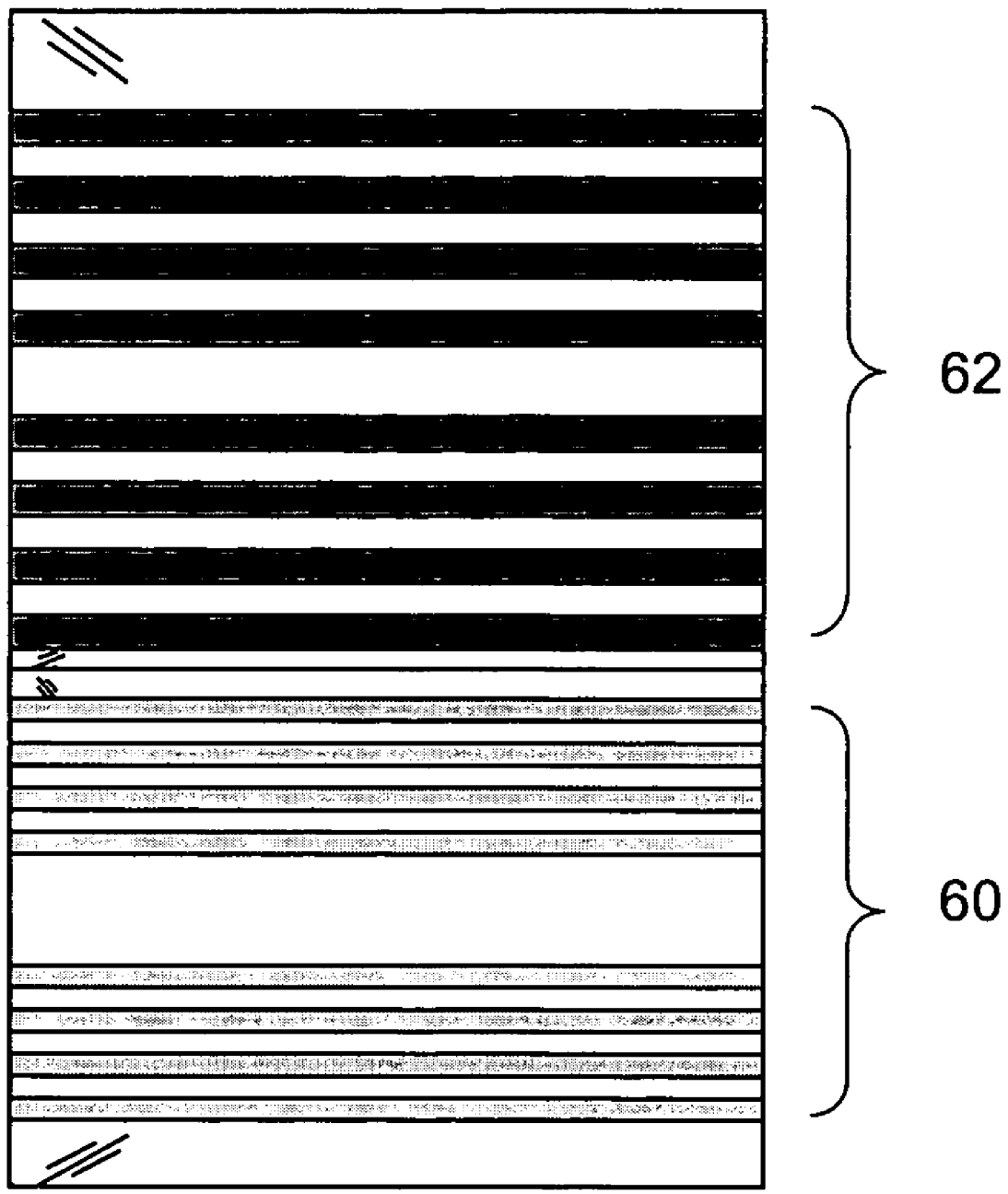
FIG. 10 illustrates a generic thin-film filter manufactured according to the invention, wherein multiple symmetric stacks are fabricated separately and combined to form the structure of the filter.
Figure 11:
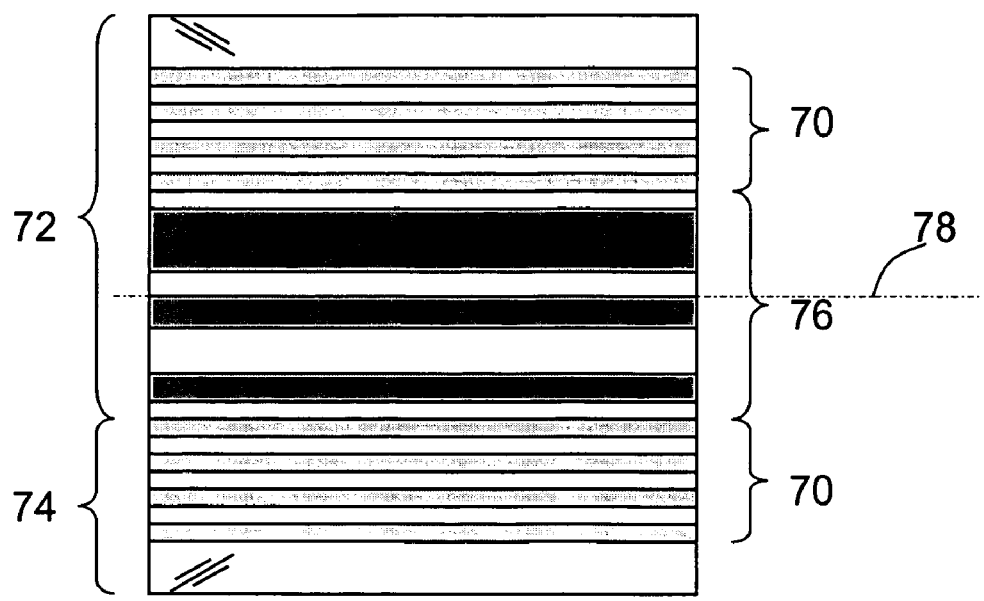
FIG. 11 illustrates another generic thin-film filter according to the invention, wherein only portions of the filter are symmetric with respect to an arbitrary plane in the filter's structure.

It is also understood that multiple symmetric structures 60,62 can be combined to make optical filters, as illustrated in FIG. 10. In such a case, each symmetric structure can be manufactured advantageously using the method of the invention and then advantageously combined using wet bonding. Similarly, as shown in FIG. 11 (and also seen in FIGS. 7 and 8), the invention can be used to manufacture filters wherein the symmetry is limited to a particular section 70 of the half-stacks 72,74 of thin-film layers fabricated by deposition. For example, in addition to a number of common layers, one half-stack (72) may include other layers 76 designed to produce particular effects. In that case both half-stacks can be fabricated and combined according to the invention to produce a structure with a limited symmetry with respect to a plane 78 passing through the additional layers.

Figure 12:
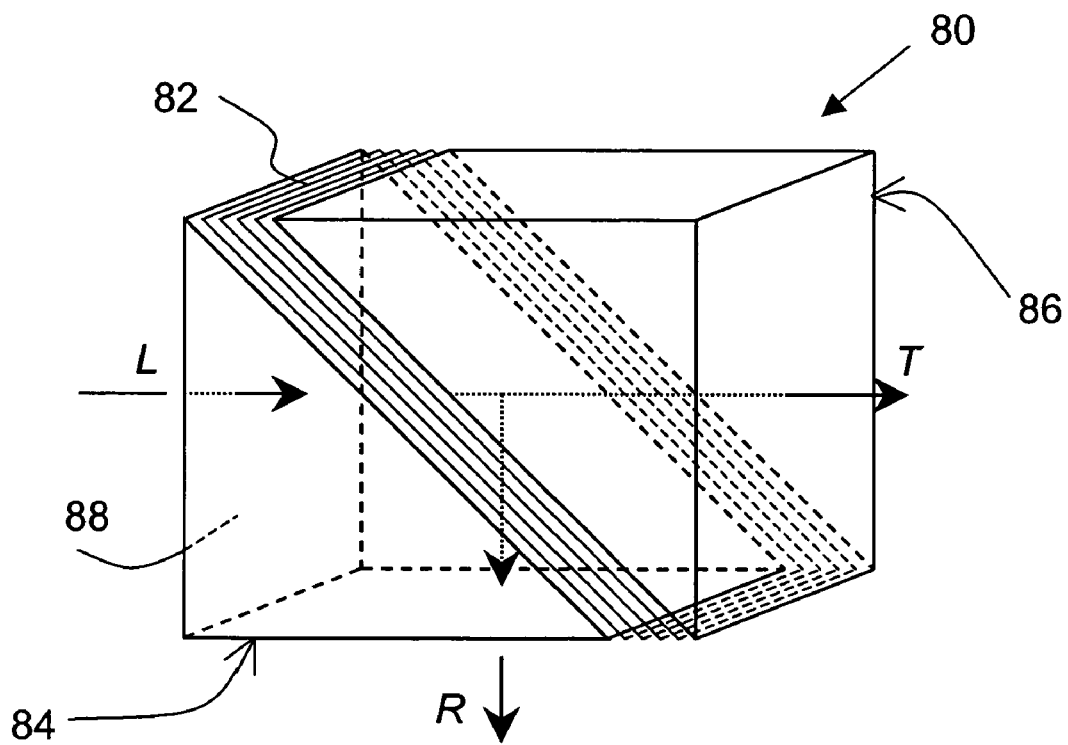
FIG. 12 is a three-dimensional view showing the narrow-band thin-film filter of the invention integrated with generic optical components.

It is also clear that the substrate used to deposit multi-layer stacks of thin films is not limited to plates, but it could be any structure suitable for deposition. To the extent that two structures can then be combined to form a filter, the procedure can be used to incorporate narrow-band filters in other optical devices. For example, FIG. 12 shows in three-dimensional view a generic optical device 80 fabricated according to the invention wherein a spectrally adjusted (if necessary) thin-film filter 82 is integrated with two generic, appropriately polished, sub-components 84,86 (in this case right-angle optical prisms) acting as substrates for the filter half-stacks. As will be clear to one skilled in the art, the device 80 acts as a chromatic beamsplitter where incident light L impinging upon the side 90 of the right-angle prism is split by the filter 82 into a transmitted beam T and a reflected beam R, with complementary respective spectral properties determined by the filter.

Finally, it is also clear that the invention could be carried out by depositing a single half-stack of thin-film material on a large substrate and then cutting the stack vertically across the layers to produce multiple half-stacks. These could then be combined as described above to produce the symmetric structures of the invention.

Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

What is claimed is:

1. A manufacturing process for a narrowband multi-layer optical filter comprising the following steps:
    (a) depositing a plurality of thin-film layers of optical material on a first support substrate having a residual rms roughness of less than one nanometer to form a first multi-layer stack of said thin-film layers;
    (b) depositing said plurality of thin-film layers of optical material on a second support substrate having a residual rms roughness of less than one nanometer to form a second multi-layer stack of said thin-film layers; and
    (c) combining said first and second multi-layer stacks to form a symmetrical structure of said thin-film layers;
    wherein at least one of said depositing, steps (a) and (b) includes depositing a layer of spacer material over said plurality of thin-film layers, and said combining step includes bonding said first and second multi-layer stacks in optical contact by wetting the first and second multi-layer stacks with a liquid film in the absence of an adhesive material, optically combining the stacks through the liquid film, and allowing the liquid film to dry.

2. The process of claim 1, wherein said depositing steps (a) and (b) are carried out contemporaneously.

3. The process of claim 1, wherein said first and second support substrates are made of different materials.

4. The process of claim 1, wherein said depositing steps (a) and (b) are carried out contemporaneously and include depositing a layer of spacer material over each of said plurality of thin-film layers.

5. The process of claim 1, further including the steps of repeating steps (a)-(c) to form multiple symmetrical structures and optically combining said symmetrical structures to produce a narrowband thin-film filter.

6. The process of claim 1, further including the step of testing the symmetrical structure so produced and, if the structure does not meet predetermined optical specifications, the additional steps of separating at least one of the multi-layer stacks from the layer of spacer material, adjusting the layer of spacer material as needed to meet said predetermined optical specifications, and again wetting the first and second multi-layer stacks with a liquid film, optically combining the stacks through the liquid film, and allowing the liquid film to dry.

7. An optical filter manufactured according to the process of claim 1.

8. An optical filter manufactured according to the process of claim 2.

9. An optical filter manufactured according to the process of claim 3.

10. An optical filter manufactured according to the process of claim 4.

11. An optical filter manufactured according to the process of claim 5.

12. An optical filter manufactured according to the process of claim 6.

13. A manufacturing process for a narrowband multi-layer optical filter comprising the following steps:
    (a) depositing a plurality of thin-film layers of optical material on a support substrate having a residual rms roughness of less than one nanometer to form a multi-layer stack of said thin-film layers;

(b) cutting said multi-layer stack to produce a first multi-layer stack and a second multi-layer stack of said thin-film layers; and (c) combining said first and second multi-layer stacks to form a symmetrical structure of said thin-film layers;

wherein said depositing step (a) includes depositing a layer of spacer material over said plurality of thin-film layers, and said combining step includes bonding said first and second multi-layer stacks in optical contact by wetting the first and second multi-layer stacks with a liquid film in the absence of an adhesive material, optically combining the stacks through the liquid film, and allowing the liquid film to dry.

14. The process of claim 13, further including the step of testing the symmetrical structure so produced and, if the structure does not meet predetermined optical specifications, the additional steps of separating at least one of the multi-layer stacks from the layer of spacer material, adjusting the layer of spacer material as needed to meet said predetermined optical specifications, and again wetting the first and second multi-layer stacks with a liquid film, optically combining the stacks through the liquid film, and allowing the liquid film to dry.

15. An optical filter manufactured according to the process of claim 13.

16. An optical filter manufactured according to the process of claim 14.

* * * * *